United States Patent [19]

Theysohn et al.

[11] 4,314,927
[45] Feb. 9, 1982

[54] FLAMEPROOFED FILLED NYLON MOLDING MATERIALS

[75] Inventors: Rainer Theysohn, Ludwigshafen; Horst Reimann, Worms, both of Fed. Rep. of Germany

[73] Assignee: BASF Aktiengesellschaft, Fed. Rep. of Germany

[21] Appl. No.: 153,705

[22] Filed: May 27, 1980

[30] Foreign Application Priority Data

Jun. 2, 1979 [DE] Fed. Rep. of Germany ....... 2922663

[51] Int. Cl.$^3$ ........................... C08K 3/02; C08K 5/34
[52] U.S. Cl. ........................... 260/37 N; 260/45.8 NT
[58] Field of Search ............... 260/45.7 PE, 45.8 NT, 260/37 N

[56] References Cited

U.S. PATENT DOCUMENTS

| 3,778,407 | 12/1973 | Hild et al. | 260/37 N |
|---|---|---|---|
| 3,806,488 | 4/1974 | Stone et al. | 260/45.7 PE |
| 3,931,101 | 1/1976 | Dany et al. | 260/45.7 PE |
| 3,951,908 | 4/1976 | Kaiser et al. | 260/45.7 PE |
| 4,001,177 | 1/1977 | Tsutsumi et al. | 260/45.8 NT |
| 4,092,284 | 5/1978 | Theyson et al. | 260/45.7 PE |
| 4,180,496 | 12/1979 | Yanagimoto et al. | 260/45.8 NT |
| 4,197,235 | 4/1980 | Nield et al. | 260/45.8 NT |
| 4,208,320 | 6/1980 | Chono et al. | 260/45.8 NT |

FOREIGN PATENT DOCUMENTS 2740092  3/1978  Fed. Rep. of Germany .

Primary Examiner—Lorenzo B. Hayes
Assistant Examiner—R. A. White
Attorney, Agent, or Firm—Keil & Witherspoon

[57] ABSTRACT

A flameproofed thermoplastic molding material which possesses good long-term stability and contains 100 parts of a nylon, 10–100 parts of an inorganic filler, 1–12 parts of red phosphorus and 1–40 parts of melamine cyanurate.

The molding materials may be used to produce moldings, especially for electrical articles.

5 Claims, No Drawings

FLAMEPROOFED FILLED NYLON MOLDING MATERIALS

The present invention relates to flameproofed nylon molding materials which have good long-term stability and which contain melamine cyanurate and red phosphorus as flameproofing agents, together with fillers.

It is known that the addition of red phosphorus to reinforced or filled nylons results in effective flameproofing (U.S. Pat. No. 3,778,407). However, under adverse conditions, such as substantially elevated temperatures or the presence of moisture, alkalis or oxygen, red phosphorus tends to form decomposition products, such as phosphine and phosphorus acids. Heavy metal impurities, even in very small amounts, additionally favor the formation of decomposition products. It is true that red phosphorus incorporated into nylons is protected against thermal oxidation because of being encased in a polymer matrix, but in the long term decomposition products can form even under these conditions, especially if the red phosphorus employed has not been stabilized to the maximum degree. This is a disadvantage in that the phosphine formed on processing the polymer granules, for example by injection molding, can lead to odor nuisance and is furthermore toxic.

Possible ways of avoiding these disadvantages are firstly to reduce the phosphorus content and secondly to stabilize the red phosphorus employed. The scope for reducing the phosphorus content is very limited, since concentrations at which the requisite flameproofing is no longer provided are rapidly reached. To stabilize red phosphorus, the phosphorus particles, which may or may not be mixed with additives, are first provided with a polymer coating and only then processed further. This method entails an additional process step and is therefore troublesome and expensive.

It is an object of the present invention to increase the stability of reinforced nylon molding materials, containing red phosphorus, by simple means without impairing the good flameproofing properties.

We have found that this object is achieved by providing a molding material which in addition to nylon, fillers and red phosphorus contains melamine cyanurate.

Accordingly, the present invention relates to thermoplastic molding materials which contain:
1. 100 parts by weight of a nylon
2. 10–100 parts by weight of an inorganic filler
3. 1–12 parts by weight of red phosphorus and
4. 1–40 parts by weight of melamine cyanurate, with or without
5. conventional assistants and additives.

German Laid-Open Application DOS No. 2,740,092 describes melamine cyanurate as a flameproofing agent for nylons. It is true that this DOS also mentions that glass fibers and fillers may be present in the nylon molding materials; however, investigations have shown that, for example, the combination of glass fiber-reinforced nylon 6,6 with from 1 to 20 percent by weight of melamine cyanurate does not exhibit any flame-retardant properties, presumably due to the wicking effect of the reinforcing filler. It was therefore surprising that the addition of melamine cyanurate to nylons containing glass fibers should boost the flameproofing action of red phosphorus and furthermore increase the long-term stability.

For the purposes of the invention nylons are preferably saturated linear nylon homopolymers, eg. polycaprolactam (nylon 6), polyhexamethylene adipamide (nylon 6,6), polyhexamethylene sebacamide, polylaurylactam and polyundecanamide, as well as nylon homopolymers and copolymers prepared by using adipic acid, azelaic acid, sebacic acid, dodecanedicarboxylic acid or terephthalic acid, on the one hand, and hexamethylenediamine, trimethylhexamethylenediamine, bis-(4-aminocyclohexyl)methane or 2,2-bis-(4'-aminocyclohexyl)-propane on the other, as well as nylon copolymers obtained by copolycondensation of lactams with the above dicarboxylic acids and diamines, and also mixtures of the said nylons.

Preferred fillers are glass fibers made from E, A or C glass, which may be provided with a sizing and an adhesion promoter. The fibers can have a diameter of from 6 to 20 $\mu$m; the mean glass fiber length in the injection molding is preferably from 0.08 to 0.5 mm. Other fillers, which may also be coated with an adhesion promoter, include silicates, eg. talc, mica, kaolin, calcined kaolin and zirconium silicate, as well as glass beads, wollastonite, quartz powder and chalk and mixtures of glass fibers with fillers. The fillers are employed in amounts from 10 to 100, preferably from 20 to 80, parts by weight per 100 parts by weight of nylon.

For flameproofing, the red phosphorus is preferably employed in an amount of from 1 to 8 parts by weight, especially from 2 to 5 parts by weight, per 100 parts by weight of nylon. The phosphorus may be of a commercial grade, which may already have been prestabilized in some other way. It can be surface-coated with a polymer or oligomer, or with a low molecular weight fluid, eg. silicone oil, paraffin oil or a phthalic acid ester or adipic acid ester. Masterbatches of red phosphorus, for example in caprolactam or nylon, may also be used. The mean particle size of the phosphorus dispersed in the plastic should preferably be from 0.0001 to 0.5 mm, especially from 0.001 to 0.2 mm.

For the purposes of the invention, melamine cyanurate is a reaction product of melamine and cyanuric acid in the molar ratio of, preferably, about 1:1. It can be prepared from melamine and cyanuric acid, as described in German Laid-Open Application DOS No. 2,740,090, but commercial grades can also be employed. Substituted melamine cyanurates are also effective. The particle size of the melamine cyanurate should preferably be from 0.0001 to 2 mm, especially from 0.001 to 0.5 mm. The product can have received an additional surface treatment, for example with slip agents, lubricants or silanes. It is employed in an amount of from 1 to 40, preferably from 5 to 30, parts by weight per 100 parts by weight of nylon.

The additives used are, in the main, light stabilizers, heat stabilizers and hydrolysis stabilizers, as well as lubricants, slip agents, mold release agents and colored pigments.

To prepare the mixtures according to the invention, the additives are worked into the nylon melt by conventional methods on extruders or other suitable kneading and mixing equipment, for example as described in U.S. Pat. No. 3,304,282. The melamine cyanurate can either be added directly to the melt or can first be mixed with red phosphorus or be applied to the plastic granules before being worked in. In a preferred embodiment, red phosphorus onto which melamine cyanurate has been precipitated by reaction of melamine and cyanuric acid in an aqueous medium is used.

In the Example, parts and percentages are by weight.

EXAMPLE

In order to test the effectiveness of melamine cyanurate in respect of the decomposition of the phosphorus, and the flameproof properties of the mixture, the following experiments were carried out:

Nylon 6,6, having a K value of 71 (measured by the method of Fikentscher, Cellulosechemie 13 (1932), (58) was melted on an extruder at from 270° to 290° C. 6 mm long chopped glass fibers, and the flameproofing agents shown in Table 1, were introduced through a downstream orifice.

50 parts of glass fibers were worked into 100 parts of nylon. The homogeneous mixture was extruded through a die, drawn off as strands, cooled and granulated.

TABLE 1

| | Composition of the samples | |
|---|---|---|
| Sample | Flameproofing agent (parts per 100 parts of nylon) | |
| 1 | 5 parts of red phosphorus + | 17 parts of melamine cyanurate |
| 2 | 5 parts of red phosphorus | — |
| 3 | — | 17 parts of melamine cyanurate |
| 4 | 22 parts of a product in which 17 parts of melamine cyanurate had been precipitated onto 5 parts of red phosphorus in an aqueous medium at 100° C. | |

Standard small bars of size 2×6×50 mm were injection-molded from the granular material. Batches of 100 of these bars, freshly molded, were introduced into a gas-tight glass flask, 5% of distilled water, based on the total weight of moldings, was added and the flask was flushed with oxygen and then evacuated down to 0.6 bar. The amount of phosphine which formed in the flask was determined by means of Dräger tubes (phosphine 50/a type, from Drägerwerke AG, Lübeck). After each measurement, the flask was flushed first with nitrogen and then with oxygen, and again evacuated down to 0.6 bar. The sum of the phosphine contents, measured after 20 days, was used as a guideline value for assessing the stabilizing action of the melamine cyanurate employed. The results are shown in Table 2. The first tests were carried out on injection-molded specimens of size 126×13×1.6 mm, by a method similar to Test Specification UL 94.

TABLE 2

| | Flameproofing properties and phosphine contents | |
|---|---|---|
| Sample | Result of fire test | Phosphine content in ppm |
| 1 | V0 | 65 |
| 2 | V2 | 180 |
| 3 | burns, not classified | — |
| 4 | V0 | 42 |

We claim:
1. A thermoplastic molding composition which contains
   1. 100 parts by weight of nylon 6.6
   2. 10–100 parts by weight of glass fibers
   3. 1–12 parts by weight of red phosphorus and
   4. 1–40 parts by weight of melamine cyanurate.
2. The composition of claim 1 which also contains one or more additives selected from the group comprising light stabilizers, heat stabilizers, hydrolysis stabilizers, lubricants, slip agents, mold release agents and colored pigments.
3. The composition of claim 1 which contains 1–8 parts by weight of red phosphorus.
4. The composition of claim 1 which contains 2–5 parts by weight of red phosphorus.
5. The composition of claim 1, 3 or 4 which contains 5–30 parts by weight of melamine cyanurate.

* * * * *